April 17, 1962 R. L. EARLY ET AL 3,030,564
CONTROL SYSTEM FOR INTERCONNECTED ELECTRIC MOTORS
Filed April 18, 1958 4 Sheets-Sheet 3

INVENTORS
RICHARD L. EARLY
ALBERT G. LAUCK
LEO PIGG
THOMAS B. SORBIE
BY Rule & Hoge ATTORNEYS United States Patent Office 3,030,564
Patented Apr. 17, 1962

3,030,564
CONTROL SYSTEM FOR INTERCONNECTED
ELECTRIC MOTORS
Richard L. Early, Albert G. Lauck, Leo Pigg, and Thomas B. Sorbie, Toledo, Ohio, assignors to Owens-Illinois Glass Company, a corporation of Ohio
Filed Apr. 18, 1958, Ser. No. 729,442
14 Claims. (Cl. 318—45)

Our invention relates to a system comprising electric motors interconnected for synchronized operation and also adapted for separate operation. The invention provides an electric motor, herein referred to as the main motor, for driving a machine, and an auxiliary motor or means for driving an auxiliary device in synchronism with the main machine. The invention further provides automatic means for transferring the auxiliary load to a separate motor when the main machine is stopped, and also provides automatic means for returning the auxiliary load to the auxiliary motor when the machine is again started. The invention includes means for automatically repositioning the auxiliary motor or driving device with respect to the machine after the latter has been stopped and again started while the auxiliary device has been kept running. The invention further provides means for stopping and starting the machine and the auxiliary device simultaneously and without loss of relative position if so desired.

The invention may be adapted for use in various fields of operation where synchronized electric motors are employed. The invention has utility, for example, in the art of making glassware such as bottles, jars and other articles and is herein described and illustrated as used for this purpose. In the manufacture of such glassware the articles are formed in molds mounted and arranged in an annular series on the rotating mold carriage of a forming machine. The mold charges of glass are dropped into the molds as the carriage rotates and brings the molds in succession to a receiving position. The molten glass as it issues from the melting and refining tank is formed into individual mold charges or gobs, their delivery to the molds being under the control of a gob feeder. The latter includes shears by which the individual charges or gobs are severed from the supply body. The mold carriage is driven by the main drive motor. The feeder includes shears operated by an auxiliary motor driven in synchronism with the main motor and operating in timed relation to the movement of the mold carriage so that the shears operate at the precise moment required to deliver each gob to a mold.

In the practical operation of the glass forming apparatus it is frequently necessary to stop the main motor and mold carriage temporarily for one purpose or another. If the glass feeder is also stopped for any appreciable length of time rapid cooling takes place so that when again started the mold charges are chilled and it is necessary to operate the feeder for some time to reestablish the right temperature condition. This results in a corresponding loss of operating time.

The present invention overcomes this objection by providing practical means for keeping the gob feeder in operation when the main motor and mold carriage are temporarily stopped. The invention also provides means for synchronizing the main motor with the auxiliary motor when the main motor has been stopped without interrupting the running of the auxiliary motor and gob feeder.

Referring to the accompanying drawings which illustrate a preferred form of the invention as employed in the manufacture of glassware.

Figures 1, 2:
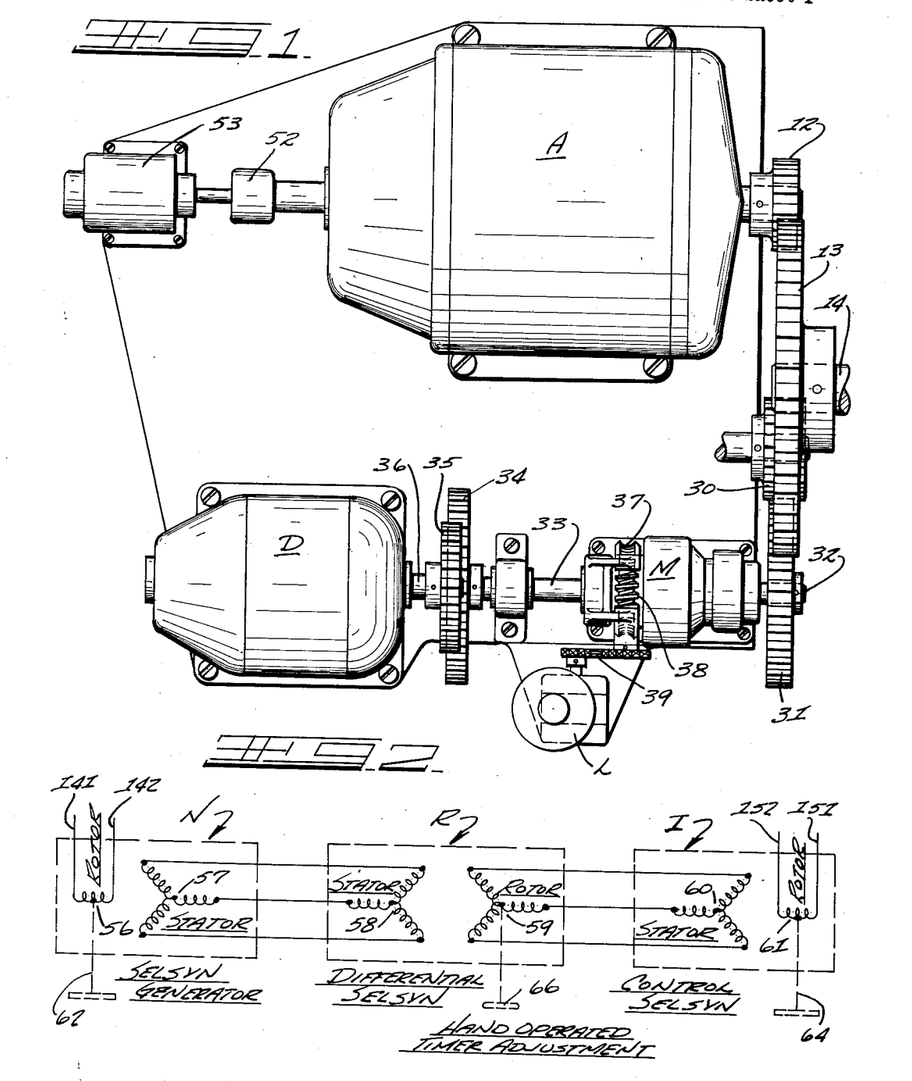
FIG. 1 is a plan view of a motor for driving the mold carriage and an auxiliary device or motor, and gearing connecting the motors.
FIG. 2 is a diagrammatic view of an auxiliary or selsyn device.
Figure 5:
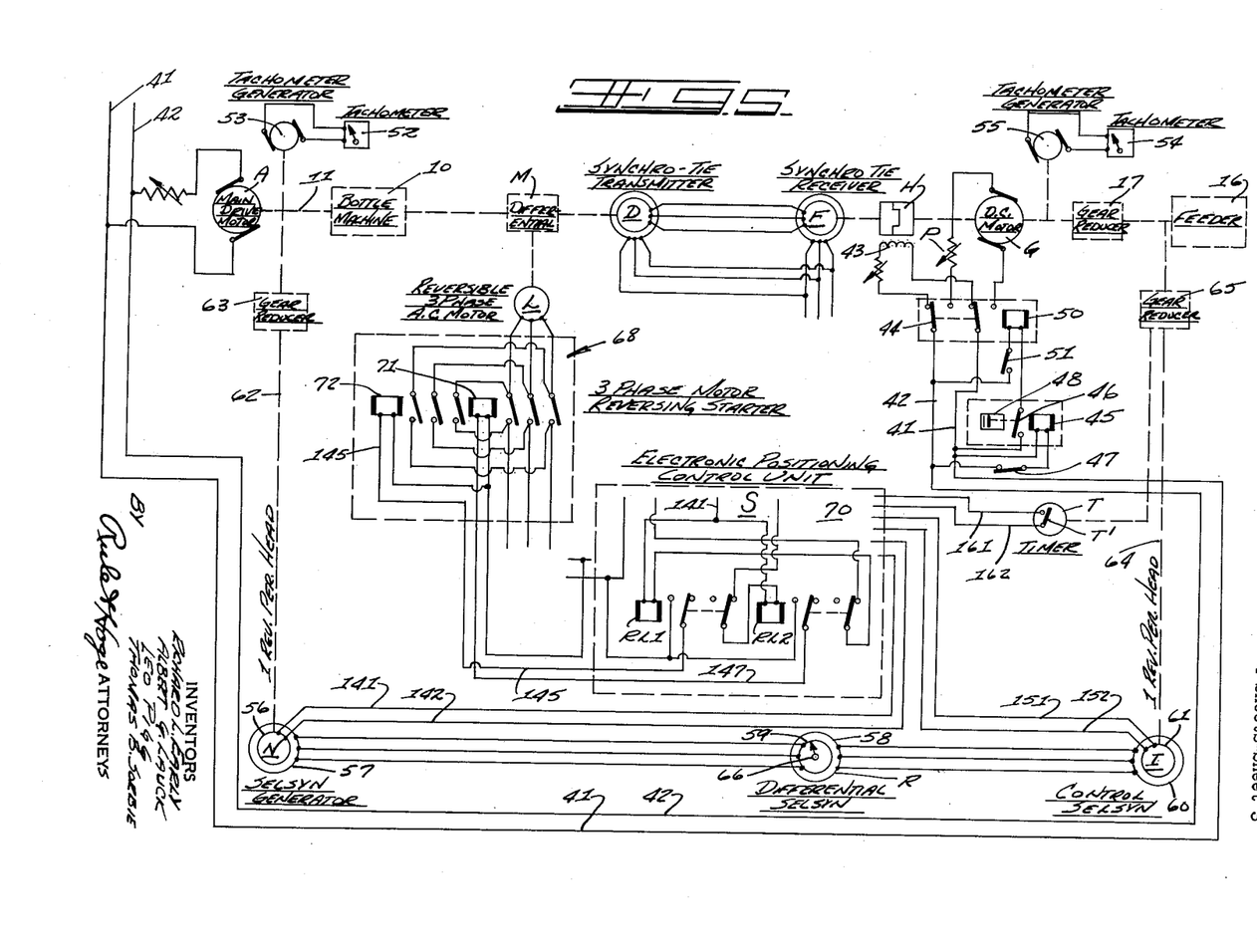
FIG. 5 is a diagrammatic view of the glass forming apparatus and the electrical operating and control system.

Referring to FIGS. 1 and 5, an electric motor A referred to as the main drive motor, is geared to a bottle machine 10 through mechanical driving connections 11. These include a gear 12 on the motor shaft, running in mesh with a gear 13 keyed to the drive shaft 14 of the mold carriage which forms a part of the bottle machine 10. In the diagram (FIG. 5) the broken lines indicate mechanical driving connections between the several parts, and the full lines indicate electrical connections.

The glass feeder 16 (FIG. 5), which may be of conventional construction including shears for severing gobs or mold charges, is normally driven by a synchro-tie device comprising a transmitter or generator D and a receiver or motor F, such synchro-tie device being of usual or well-known construction and mode of operation. This synchro-tie operates through a train of gearing including a magnetic particle clutch H and a variable speed motor G, the latter normally being driven idly, and a gear reducer 17 geared to the feeder 16. With these driving connections from the main motor A the feeder shears are operated periodically, in synchronism with the movement of the mold carriage, to sever a mold charge or gob each time a mold is brought into register with the feeder.

Figure 3:
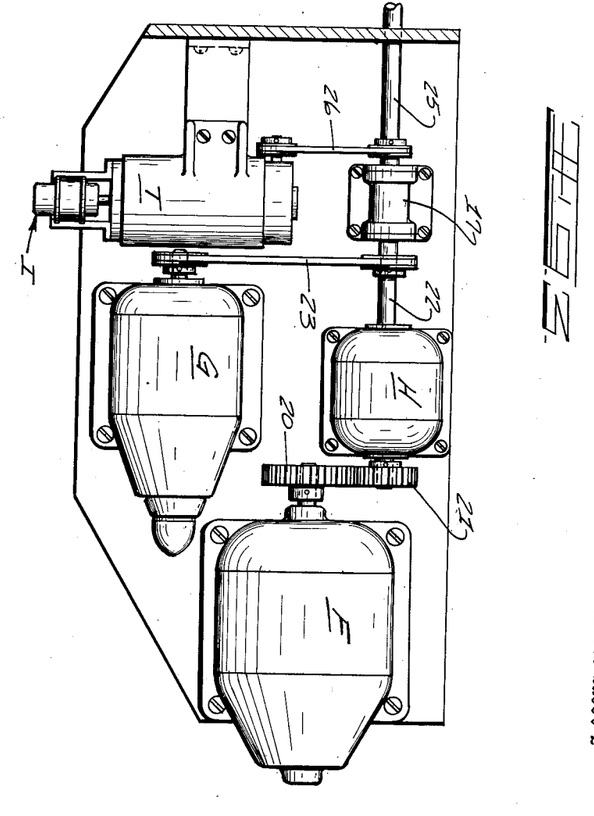
FIG. 3 is a plan view showing a selsyn receiver or motor and a supplemental motor and interconnected driving mechanism.
Figure 4:
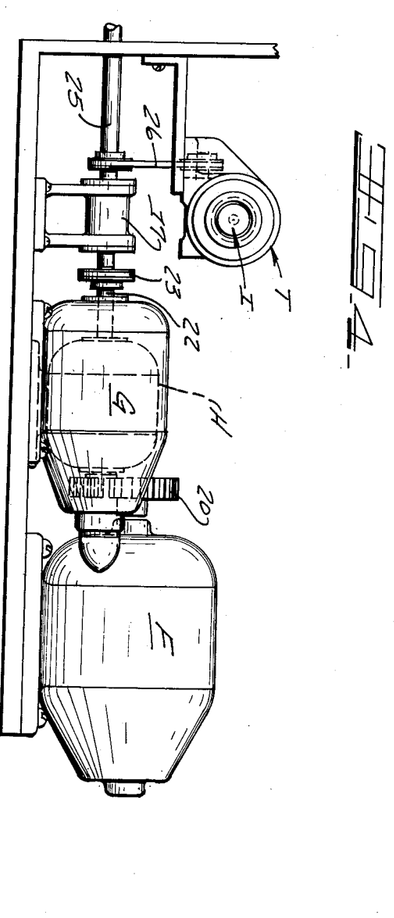
FIG. 4 is an elevational view of the parts shown in FIG. 3.

Referring to FIGS. 3 and 4, the synchro-tie receiver or motor F has driving connections with the motor G through a train of gearing including intermeshing gears 20 and 21 keyed respectively to the shaft of the motor F and a shaft of one member of the magnetic clutch H, which may be a Vickers magnetic clutch of known construction. The other clutch element is connected through a shaft 22 and a belt 23 to the drive shaft of the motor G. The shaft 22 is also connected through the gear reducer 17 to the shaft 25 which has operating connection with the feeder 16.

A timer T is driven from the shaft 25 geared thereto by a belt 26. The timer is geared to make one complete rotation during each cycle of the gob feeder. The timer includes a normally open switch T' which is closed once during each cycle for a purpose hereinafter described.

Operating connections between the main drive motor A and the synchro-tie transmitter D include the gear 13 (FIG. 1), a pinion 30 driven thereby and a gear 31 running in mesh with the pinion 30. The gear 31 is keyed to the shaft 32 of one element of a differential M, the other shaft 33 of the differential has driving connections with the synchro-tie transmitter D through gears 34 and 35 keyed respectively to the shaft 33 and shaft 36 of the transmitter D. A motor L (FIGS. 1 and 5), shown as a reversible three-phase alternating current motor, has operating connection with the differential M through gearing including a worm wheel 37 keyed to the shaft 33 and meshing with a worm 38 geared through a chain 39 to the motor L. The motor L is used to adjust the differential M for adjusting the operating time of the feeder shear with respect to the position of the molds, as hereinafter described.

Referring to FIG. 5, the main drive motor A is driven by direct current supplied through the mains 41 and 42. As before noted, the motor F normally drives the feeder 16 through a train of gearing including the magnetic clutch H, the motor G in open circuit, and the gear reducer 17. When it is desired to stop the bottle machine without stopping the feeder, the clutch H is opened and the motor G connected to the mains 41, 42, so that the feeder is driven by the motor G. The control system for these operations is as follows:

The stationary excitation coil 43 of the magnetic clutch H is connected through a double pole switch 44 to the mains 41, 42. The switch, in the position shown, completes the circuit for the coil 43. When the switch 44 is shifted it opens the circuit for the clutch coil 43, thereby disengaging the clutch, and at the same time completes a circuit for the motor G which is then driven by current supplied from the mains 41, 42. A time delay relay comprises a solenoid 45 which operates a switch 46. Current supply to the solenoid is through a switch 47. The switch 47 is in the starter circuit for the main drive motor A and is normally open while the motor A is running and automatically closes when the motor is stopped. The time delay relay includes a time delay dash pot or device 48 which causes a slow break when the solenoid 45 is de-energized and permits a quick closing of the relay switch 46 when the switch 47 is closed.

The double pole switch 44 is operated by a solenoid 50 in a circuit connected across the mains 41 and 42, said circuit including the time delay switch 46 and a hand selector switch 51. As shown, the magnetic clutch is in closed position and the motor G in open circuit so that the feeder is driven from the main motor A. If it is desired to stop the bottle machine without stopping the feeder, the operator closes the hand selector switch 51 and then operates the starter switch for stopping the motor A. The switch 47 is thus closed so that the solenoid 45 closes the switch 46, thereby completing a circuit for the solenoid 50 which then reverses the switch 44. The clutch H is thus opened and a circuit completed for the motor G which is immediately powered by current from the mains 41, 42, so that the feeder 16 is driven without interruption.

When the main motor A is again started for driving the bottle machine the switch 47 is automatically opened so that the solenoid 45 is de-energized. This is followed by the opening of the time delay relay switch 46 after a time delay so that the solenoid 50 is de-energized and the switch 44 reversed. The magnetic clutch is thus operated and at the same time the circuit for the motor G is opened so that the feeder 16 is again driven from the main motor. These operations take place without interruption in the operation from the feeder. The time delay in the opening of the switch 45 permits the main motor to be brought up to speed before the circuit for the motor G is opened and the load shifted. If it is desired to stop the feeder when the main motor is stopped, the hand selector switch 51 is left open so that the magnetic clutch remains closed and the circuit for the motor G remains open.

Referring to FIGS. 1 and 5, a tachometer 52 is driven by a tachometer generator 53 on the main motor shaft. A second tachometer 54 is driven by a tachometer generator 55, the latter being geared to the motor G. By means of these tachometers the speed of the motor G, while the latter is being driven by power from the mains 41 and 42, can be compared with that of the main motor and, by adjusting the rheostat P, brought to substantially the same speed as the main drive motor A, so that the load may be shifted to the main motor without shock or strain on the mechanism when the clutch H is operated.

Means for synchronizing the operation of the feeder with that of the bottle machine includes a selsyn device as shown in FIGS. 2 and 5. This device includes a selsyn generator N, a differential selsyn R, and a control selsyn I. The selsyn generator includes a rotor 56 and a stator 57. The differential selsyn R comprises a stator 58 and a rotor 59. The control selsyn I includes a stator 60 and a rotor 61. The rotor 56 is connected to mains 141 and 142 in a single phase alternating current system which may be, for example, a 115 volt 60 cycle system. The rotor 56 has mechanical connections 62 to a gear reducer 63 connected to be driven by the motor A and driving the rotor 56 at a speed determined by that of the bottle machine 10. The rotor 61 is driven from the feeder 16 through mechanical driving connections 64 including the gear reducer 65. The rotor 61 is driven one complete rotation during each cycle of the feeder, that is, one rotation during the time interval between successive operations of the feeder shears. The rotor 56 of the selsyn generator is also driven one revolution during each cycle of the feeder. The rotor 59 of the differential selsyn R is rotatably adjustable by a hand knob 66 (FIG. 2) to secure the desire relationship between the gob cut-off time and the position of the blank molds on the rotating bottle machine carriage.

For any one position of the differential selsyn stator 58 with respect to its rotor 59, there are two positions, 180° apart, of the control selsyn rotor 61 with respect to the selsyn generator rotor 56, at which the error signal from the control selsyn rotor will be zero. These two null voltage points can be moved to any desired positions (always 180° apart) by turning the differential selsyn rotor 59 by its knob 66 with respect to its stator. The theory of this arrangement is well known.

If either the selsyn generator rotor 62 or the control selsyn rotor 61 is moved with respect to the other, so as to depart from a correct relative position as chosen by the setting of the differential selsyn rotor 59, the control selsyn rotor 61 will have a voltage induced in it and this voltage will be transmitted to the phase sensitive detector (FIG. 6, hereinafter described) through wires 151 and 152.

One of the null voltage points mentioned above will occur when the gob is being cut off at the right time to fall into the moving blank mold. The other null point will occur when the gob cut-off is occurring midway between blanks. In order to obtain the correct phase relation for proper operation, it is necessary for the control system including the selsyns, the phase sensitive detector, and the reversible motor L which positions the transmitter differential M, to cause operation of the differential M until the correct null voltage for proper operation is formed. The following explanation of the control selsyn output, along with the description of the phase sensitive detector operation, will explain how this is accomplished.

Assume that the correct relative operating points of the selsyns are as shown. When the control selsyn rotor 61 is moved clockwise with respect to rotor 56 it delivers a voltage which is leading the line voltage by 180° in phase angle. This voltage is zero at 0 degrees displacement, rises to a maximum at 90° and falls to zero again at 180°, but whatever its magnitude, it is always 180° ahead of the line voltage in phase angle. This voltage actuates the phase sensitive detector (FIG. 6), the relay system, and the synchro-tie differential drive rotor L in such a direction as to restore the relative positions of the rotor 56 and rotor 61 to 0. In the other half circle from 270°–0, the control selsyn delivers a voltage in phase with the line voltage. This voltage rises to a magnitude peak at 270° displacement, but again is always in phase with the line voltage. This voltage actuates the phase sensitive detector, the relay system, and the synchro-tie differential drive motor M so as to move the rotor 61 away from 180° and toward 0 as before. The correction system will always move the gob cut-off time to synchronize it with the closest mold on the bottle machine.

The function of the differential selsyn is to allow the operator to advance or retard the gob cut-off time so as to obtain the best overall machine operation.

If the feeder is running while the machine is stopped, the selsyn system will automatically reposition the feeder with respect to the machine when the machine is started.

The operator may adjust differential selsyn R by means of the knob 66 to vary the gob cut-off with respect to the bottle machine rotation. If the feeder is not in proper relationship to the machine after the machine starts, control selsyn I sends an error signal to the electronic positioning control unit (FIG. 5) which controls the reversible motor L, causing it to drive the transmitter differential M until proper position is restored. The timer T serves to prevent Hunting by blocking error signals except at gob cut-off time.

The motor L (FIG. 5) operates automatically to adjust the differential M for synchronizing the motor G and the feeder driven thereby for obtaining and maintaining a proper phase relation between the feeder shears and the molds on the bottle machine. A three-phase motor reversing starter 68 controls the operation of the motor L. The starter 68 is under the control of an electronic-positioning control unit 70 which controls the circuit for the solenoids 71 and 72 of the starter 68.

The phase-sensitive detector and adjusted means, as shown in the wiring diagram, FIG. 6, will now be described. Power for operating this control mechanism is supplied through the mains 141 and 142 of an alternating system, as, for example, a 60 cycle, 115 volt system. A transformer T1 has its primary winding connected to the mains 141, 142. A secondary winding of transformer T1 has leads connected thereto at the points 3, 4, 5 and 7. A coil 75 which is another secondary winding of the transformer has connection $x$ with the heaters of the tube VI for supplying power to the heaters. The transformer T1 forms a source of a direct current voltage in a circuit comprising resistors R14, R15 and condensers C8a and C8b. This voltage appears between the contact point 4 of the transformer and a lead 76 which forms a junction of resistors R15, R13 and a potentiometer R11. The lead 77 from point 4 of the transformer is positive relative to the lead 76. A voltage divider composed of a resistor R7 in series with parallel connected potentiometers R8 and R9, resistor R10 and series connected resistors R12 and R13 in parallel with the potentiometer R11, is used to provide various direct current voltages utilized in the operation of the positioner.

A transformer T3 has its primary connected to the mains 141, 142. The secondary of this transformer has connections $y$ with the heaters of the tubes V2, V3, and V4 for heating the cathodes.

Figure 6:
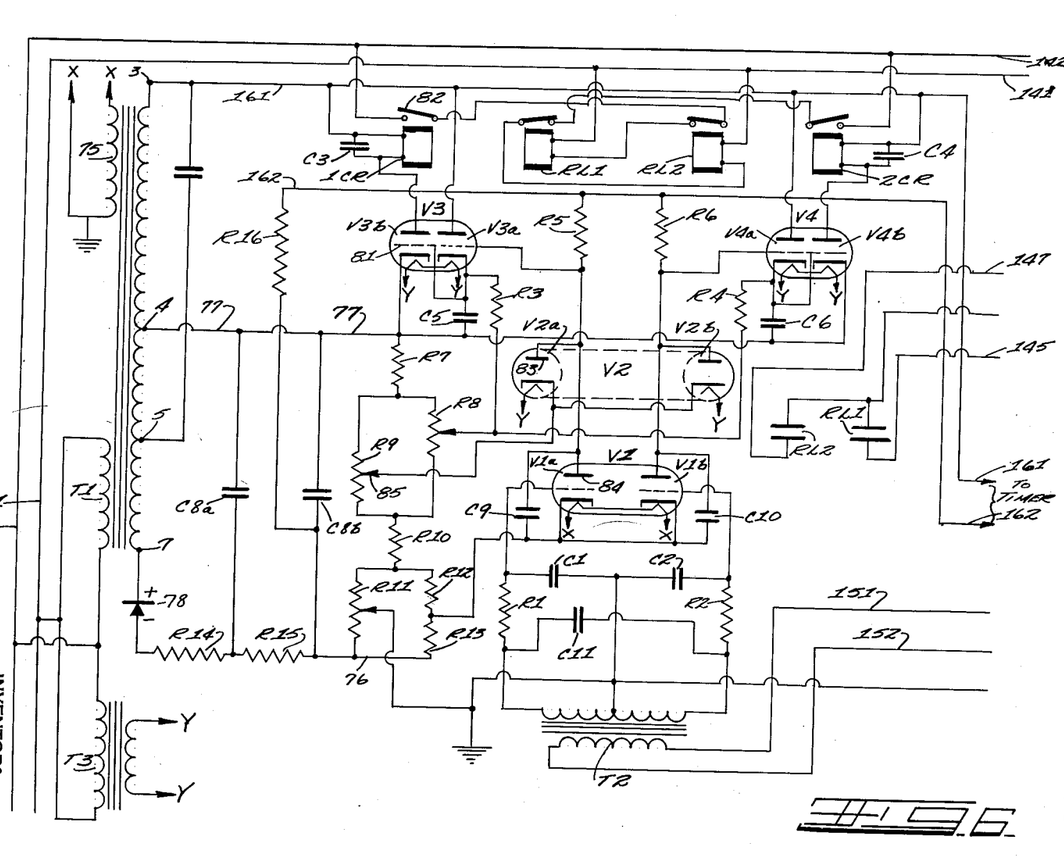
FIG. 6 is a wiring diagram of the phase sensitive detector and adjusting means.

The signal input from the selsyn system (FIG. 2) extends from the control selsyn I through the leads 151 and 152 to the primary of the transformer T2 (FIG. 6). Connected across the secondary winding of this transformer is a capacitor C11 which alters the phase of the signal that appears across the transformer. Capacitors C1 and C2 in conjunction with resistors R1 and R2 alter the phase of the signal appearing across the transformer T2. The inductances present in the selsyns cause a phase shift from their output with regard to the voltage applied to the input of the selsyns. The capacitors C1, C2, and C11 serve to correct the phase shift introduced by the inductance of the selsyns. The resistors R1 and R2 serve to prevent the flow of excessive grid current when the grids of the tube VI are driven positive to their respective cathodes by the signal appearing across the secondary of the transformer T2.

The timer switch T' of the timer T (FIG. 5) when closed completes two circuits, including the secondary winding of the transformer T1 between the points 3 and 7. One of the circuits may be traced from the point 3 through lead 161, timer switch T', lead 162, plate load resistor R5, triode V1a of tube VI, resistors R13, R15, and R14, and a selenium rectifier 78 to contact 7. The other circuit may be traced from the contact point 3 through lead 161, timer switch, lead 162, plate load resistor R6, triode V1b of tube VI, resistors R13, R15, R14, and rectifier 78 to the point 7. It will be noted that these circuits coincide except through parallel sections, one of which comprises resistor R6 and triode V1b, the other comprising resistor R5 and triode V1a.

When the timer switch T' closes, and the polarity of the A.C. voltage appearing across the secondary of the transformer T1, between points 3 and 7 is such that the plates of triodes V1a and V1b are positive to their cathodes, plate current may flow in either triode provided that no signal or a signal of positive polarity is present at the triode's respective control grid. If a negative polarity signal is present at either control grid, no plate current will flow through that particular triode. The resistances of the plate load resistors R5 and R6 are large compared to the plate resistances of triodes V1a and V1b, while conducting, so most of the voltage appearing between lead 162 and the cathodes of triodes V1a and V1b will be dropped across the plate load resistors. If either of the triodes has a sufficiently negative signal applied to its grid, and no plate current flows through it, there will be no voltage drop across its respective plate load resistor (R5 or R6). Both triodes will conduct when no signal is present at the grids of the triodes. When an error signal is present, one tube will conduct and the other will not conduct plate current.

A triode V3a has its grid connected to the plate of the triode V1a. The plate of triode V3a connects through lead 161 to point 3 in the secondary of transformer T1. The cathode of triode V3a connects to a plate of a capacitor C5. The other plate of capacitor C5 connects through the lead 77 to point 4 of transformer T1.

A means of charging the capacitor C5 comprises the section of the T1 transformer secondary between terminals 3 and 4 (when energized so that terminal 3 is positive to terminal 4) in combination with the triode V3a and the capacitor C5. The charging of capacitor C5 can be controlled by the potential at the control grid of the triode V3a which is the potential at the plate of triode V1a.

A resistor R3 has one end connected to the upper plate of capacitor C5. The other end of resistor R3 connects to the adjustable tap of potentiometer R8. Resistor R7 and potentiometer R8 are part of the D.C. voltage supply and the adjustable tap of potentiometer R8 will be at a negative potential relative to that of the lead 77 joining the resistor R7 and the lower plate of capacitor C5. The combination of the series connected capacitor C5 and resistor R3 in parallel with the D.C. voltage divider resistor R7 and potentiometer R8, forms a means of charging capacitor C5 to a polarity in opposition to the charge impressed on capacitor C5 by the action of transformer T1 secondary (between points 3 and 4), when energized so that terminal 3 is positive to terminal 4 and triode V3a in combination with capacitor C5. The charging rate of capacitor C5 through resistor R3 may be controlled by the setting of the adjustable tap of potentiometer R8. Capacitor C5 can charge quickly through triode V3a. Because resistor R3 has high resistance, capacitor C5 charges slowly through resistor R3.

When the timer switch T' is closed and during the portion of the A.C. cycle that point 3 and lead 161 are at a positive potential relative to the cathode of triode V1a, and providing that the grid of triode V1a has a sufficiently negative error signal from transformer T2 to prevent passage of a high plate current through triode V1a and a consequent large voltage drop across resistor R5, then the grid of triode V3a will be at a sufficiently positive potential relative to the cathode of triode V3a to allow charging of capacitor C5 through triode V3a. Upon the imposition of this voltage on capacitor C5 which will be dissimilar to the D.C. voltage drop between the wire 77 (at the junction of resistor R7 and the lower plate of capacitor C5) and the adjustable tap of potentiometer R8, then the capacitor C5 will slowly charge through resistor R3.

The triode V3b has its cathode connected through lead 77 to point 4 of transformer T1. Its plate connects to a plate current relay coil 1CR. The other terminal of relay 1CR connects through lead 161 to point 3 of transformer T1. A capacitor C3 is connected in parallel with the relay coil 1CR. The control grid 81 of the triode V3b connects to one plate of the capacitor C5. The other side of the capacitor C5 is connected to the cathode of a triode V4b.

The combination of the T1 transformer secondary (between points 3 and 4), triode V3b, relay 1CR and the capacitor C3, serves as a means for operating the relay 1CR, controllable by the voltage present at the grid of triode V3b, as will now be explained. When point 3 of transformer T1 is positive relative to point 4 of transformer T1, current may flow through the circuit composed of triode V3b, relay 1CR in parallel with capacitor C3, and T1 transformer secondary 3—4, provided that the grid 81 of triode V3b is not at a high negative potential to the cathode of triode V3b. When capacitor C5 has charged through triode V3a, the voltage on the capacitor C5 and the grid 81 will allow a sufficient plate current flow to operate the relay 1CR. Since the voltage applied to the plate of triode V3b is an A.C. voltage, plate current will flow only during the positive going excursions. Capacitor C3 filters the pulsating direct current that appears across the relay 1CR, thereby reducing relay chatter.

When the timer switch T' opens, the capacitor C5 will not be able to receive a charge through triode V3a, but will get charged toward the opposite polarity through resistor R3. In time the voltage across capacitor C5 and on the grid 81 of triode V3b will be sufficiently negative to reduce the plate current through triode V3b to a value insufficient to maintain the switch 82 of relay 1CR closed. Relay 1CR contacts will then open. For large corrections, resistor R8 will be adjusted to allow a slight overlap between timer switching cycles thereby maintaining switch 82 of relay 1CR closed for the required duration of the correction. When a small correction is required, and a small negative signal is present at triode V1a, the plate current of the triode V1a will be reduced to a value that allows only a limited charging of capacitor C5 through triode V3a. Consequently, the time required for the charge on capacitor C5 to reach a value insufficient to maintain the required plate current through triode V3a, will be approached sooner with the result that the relay 1CR will "jog." This action is desirable. Means for limiting the extent of the charge impressed on capacitor C5 through triode V3a will presently be described.

A diode V2a has its plate 83 connected to the plate 84 of the triode V1a. The cathode of the diode V2a is connected to the adjustable tap 85 of the potentiometer R9, which potentiometer is part of the D.C. voltage supply. When the plate of diode V2a becomes positive to its cathode, current will flow through the diode. The circuit in which current may flow through diode V2a is composed of diode V2a, resistor R5, the timer switch T', the secondary (between points 3 and 7) of transformer T1, rectifier 78, resistances R14, R15, potentiometer R11 in parallel with resistances R12 and R13, resistance R10 and that portion of potentiometer R9 below the adjustable tap 85. The resistor R5 has a much higher resistance than all the other components, so that most of the voltage drop will be across resistor R5. Diode V2a will draw current only when the triode V1a is cut off by a high negative voltage at its grid, the timer switch T' is closed, and point 3 of transformer T1 is positive to the cathode of triode V1a. Diode V2a limits the positive going excursions of the plate 84 of triode V1a and the grid of triode V3a, thereby limiting the extent that capacitor C5 may be charged through the triode V3a. The circuitry described, by placing a limit to which capacitor C5 may be charged through the triode V3a, also protects the grid 81 of triode V3b from damage. Potentiometer R9, which sets the voltage at which diode V2a limits the voltage excursion of plate 84 of triode V1a, is adjusted to a level that prevents cathode to grid conduction in triode V3b.

The foregoing describes the circuits involved when detecting a relative position of the feeder and forming machine in which the feeder is out of synchronism or proper relation to the bottle machine, either in an "advanced" or a "retarded" position. In both such "advanced" and "retarded" positions or relations the detecting means uses the same power transformers T1 and T3, signal input transformer T2, timer switch T' and D.C. power supply (mains 41, 42). The following elements employed in detecting the "advanced" position and referred to in the above description, namely, triodes V1a, V3a and V3b; diode V2a; relay 1CR; capacitors C3, C5; resistors R1, R3, R5, etc., are substantially duplicated in detecting the "retarded" position by corresponding parts, namely, triodes V1b, V4a, V4b; diode V2b; relay 2CR; capacitors C4, C6; resistors R2, R4, R6; etc.

Capacitors C9 and C10 are filtering resistors that serve to prevent "triggering" of the positioning means due to transient voltage. A resistor R16 keeps the plates of the triodes V1a and V1b at a low potential except when the timer switch is "on" and serves as a protection against transient "triggering."

A means for varying the grid bias impressed upon the triodes V1a and V1b, and thereby controlling the "neutral zone" of the positioner, is provided by the combination of the series resistors R12 and R13 in parallel with the potentiometer R11, the adjustable tap of potentiometer R11 connected to ground, with the junction of resistors R12 and R13 connected to the cathodes of the triodes V1a and V1b, and with the center tap of the secondary of transformer T2 connected to the ground. The more negative the grids of the triodes V1a and V2a are maintained to the cathodes, the narrower the "neutral zone" will be, generally.

Relays RL1 and RL2 are A.C. relays and are controlled by the relays 1CR and 2CR. The contacts of the relays RL1 and RL2 control the motor L which operates the synchro-tie differential M for effecting the phase adjustment of the feeder 16.

The actions involved in sensing the relative positions of the Selsyns N and I and effecting the adjustment of the feeder 16 relative to the bottle machine 10 may be described as follows:

Assuming the motor A to be running and driving the machine 10 and feeder 16;

(1)

a. The timer switch T' closes.
b. The contact 3 of transformer T1 and lead 161 become positive to the cathode of the triode V1a.
(c) A negative polarity signal is present at the grid of triode V1a.

(2)

a. Little or no plate current flows through triode V1a.
b. Diode V2a limits the positive voltage excursion at the anode of triode V1a.
c. Condenser C5 charges through triode V3a, reducing the negative bias on the grid 81 of triode V3b.
d. Triode V3b conducts, energizing relay 1CR coil.
e. Relay switch 82 closes and completes the power circuit to relay RL1 coil, thus closing the contacts of relay RL1.
f. Relay RL1 contacts complete a circuit (through lead 145, FIGS. 6 and 5) for the relay 72 of the starter 68 and starts the motor L which then operates the synchro-tie differential M which adjusts the relative position of the Selsyns N and I.

(3)

a. The timer switch T' opens.
b. Capacitor C5 charges slowly through the resistor R3. However, the voltage on capacitor C5 is sufficiently positive to maintain plate current through the triode V3b sufficient to hold relay 1CR closed, which in turn maintains relay RL1 closed. This in turn effects the operation of the synchro-tie differential M.

(4)

a. The timer switch T' closes.
b. If a negative signal is present at the grid of triode V1a when point 3 of transformer T1 is positive to the cathode of triode V1a, capacitor C5 charges again through triode V3a, relays 1CR and RL1 are held closed, and the synchro-tie differential M continues its corrections.
c. If no negative signal is present at the grid of triode V1a, the triode conducts heavily causing a large voltage drop across resistor R5, the grid of triode V3a, being sufficiently negative to prevent charging of capacitor C5 through triode V3a, and capacitor C5 shortly charges sufficiently through resistor R3 to cut off the plate current of the triode V3b. Consequently relay 1CR and then relay RL1 will open their contacts and the synchro-tie differential motor L will stop its correcting movements.

Modifications may be resorted to within the spirit and scope of our invention as defined in the appended claims.
We claim:

1. The combination of a machine, a main electric motor, means providing driving connections between the main motor and said machine for operating the latter at a predetermined speed of operation, means for starting and stopping the motor and thereby starting and stopping said machine, an auxiliary load device adapted for operation in synchronism with the operation of said machine at a predetermined speed therefor, means providing driving connections between said machine and said auxiliary load device by which the latter is driven with the machine and in synchronism with the former, an auxiliary electric motor selectively energizable to run at an operating speed to maintain said predetermined synchronized speed of the auxiliary device operatively connected for driving said auxiliary device upon stopping said machine, and control means controlling the operation of said auxiliary motor and operative selectively to energize said auxiliary motor to drive said auxiliary device when the main motor is stopped and thereby maintain the continuous operation of the auxiliary device at said predetermined synchronized speed therefor while the main motor and machine are at rest, said control means being operable also to effect the starting and stopping of said auxiliary motor concurrently with the stopping and starting of the main motor and said machine.

2. The combination of a machine, a main electric motor, means providing driving connections between the motor and machine, an auxiliary load device adapted for operation in synchronism with the operation of said machine, means providing driving connections between the machine and the said auxiliary load device, including a synchro-tie transmitter, means providing a driving connection for said transmitter for driving the latter under power of said main motor, a synchro-tie receiver operated by the said transmitter and an electro-magnetic clutch operable for connecting said receiver to drive the auxiliary load device, an auxiliary electric motor operatively connected to said auxiliary load device, and selective means operable for effecting the operation of the said auxiliary motor for driving the said auxiliary device and without interruption when the main motor and said machine are stopped and for stopping and starting the auxiliary device concurrently with the stopping and starting of the main motor.

3. The combination set forth in claim 2, wherein said means providing a driving connection for said synchro-tie transmitter comprises a differential including an input shaft and an output shaft, an operating connection between said input shaft and the main motor for driving said input shaft at a predetermined speed, a driving connection between said output shaft and the synchro-tie transmitter, and differential gearing connecting said input and output shafts, said gearing being operable for adjusting the rotational relationship between said input and output shafts, and automatic means connected to operate said differential gearing of the differential for effecting and adjusting operation of said receiver through the transmitter and bringing the operation of said auxiliary device into synchronism with the operation of said machine when the latter is started during the operation of said auxiliary device.

4. The combination of a machine, a main drive motor for driving the machine, means for starting and stopping said main motor, an auxiliary load device adapted for operation in synchronism with the operation of said machine, an auxiliary motor energized upon stopping said main motor by the operation of said means for driving said auxiliary load device while the main motor and machine are at rest, said auxiliary motor being deenergized upon starting said main motor by operation of said means, means providing driving connections from the main motor to said auxiliary device, said connection providing for driving said auxiliary motor by said main motor after the latter is started, a tachometer generator operatively connected to each the main drive motor and the auxiliary motor, tachometers operated by each said generator, adjusting means for adjusting the speed of the auxiliary motor to correspond to that of the main motor, and means for uncoupling the load of said auxiliary load device from the main drive motor upon stopping the latter, the auxiliary load device then being driven by the auxiliary motor.

5. The combination of a machine, a main drive motor operatively connected to the machine for driving the machine, an auxiliary load device adapted to be driven in synchronism with the operation of said machine, means providing driving connections between said machine and said auxiliary device, said connections including an electro-magnetic clutch comprising a solenoid for operating the clutch members, an auxiliary motor having driving connections with said auxiliary load device, electrical control means controlling the operation of the said clutch and auxiliary motor, said control means including means for connecting the auxiliary motor to a source of electric current supply and thereby driving the auxiliary motor and causing it to drive said auxiliary load device and concurrently de-energizing said solenoid and opening the clutch, thereby disconnecting the auxiliary load device from the main motor.

6. The combination set forth in claim 5, the said control means for the auxiliary motor and said solenoid comprising a double pole switch operative to connect the auxiliary motor with a source of current supply and simultaneously open the circuit of the said solenoid, a switch solenoid for operating said switch, said switch solenoid being in a control circuit for the main drive motor and operable when the main drive motor is stopped for effecting the operation of said switch and thereby causing the auxiliary motor to drive the auxiliary load device when the main motor is stopped.

7. The combination of a machine, a main drive electric motor operatively connected to the machine for driving the machine, an auxiliary load device adapted for operation in synchronism with the operation of said machine, means forming driving connections from the said machine to the auxiliary load device, said connections including a differential and an electro-magnetic clutch, an auxiliary motor having driving connections with the auxiliary load device, means for starting and stopping the main drive motor, means for automatically establishing a circuit for the auxiliary motor when the main drive motor is stopped and thereby causing the auxiliary motor to drive the auxiliary device without interruption when the main drive motor is stopped, means for automatically opening the clutch when the auxiliary motor is connected to drive said auxiliary load device, said auxiliary load device being operable in cycles, said machine having means operable in cycles, a selsyn generator, means providing a driving connection between the said machine and selsyn generator for driving the latter through one revolution for each cycle of the said machine, a control selsyn, means for providing driving connections between said auxiliary device and the control selsyn for operating the latter through one revolution for each cycle of the auxiliary device, a differential selsyn connected between the said selsyn generator and control selsyn for adjusting the differential selsyn to adjust the phase relation between the selsyn generator and the control selsyn, a reversible electric motor, means providing driving connection between said reversible motor and said differential, a reversible starter for said reversible motor, an electrical positioning control unit electrically connected to said starter, and electrical connections from said control selsyn to said positioning control unit for operating the latter and thereby operating the starter for a reversible motor and thereby effecting operation of the reversible motor and differential and thereby bringing the load device into a phase relation to the main motor determined by the phase relation of the control selsyn to that of the selsyn generator.

8. The combination set forth in claim 7, including means for automatically stopping said reversible motor when the load device has been brought into said phase relation to the main motor.

9. The combination of a first motor, a load device, means forming mechanical driving connections extending from the first motor to the load device to operate the latter at a predetermined speed, said connections including a clutch, an auxiliary electric motor, means providing mechanical driving connections extending from the auxiliary motor to said first-mentioned driving connections at a point intermediate the load device and the clutch whereby said auxiliary motor is driven mechanically by the first motor at an operating speed, and means for concurrently opening the clutch and energizing the auxiliary motor to operate it at its same said operating speed by connecting the auxiliary motor to a source of current supply, whereby the auxiliary motor operates to drive said load device at the said predetermined speed while the first motor is disconnected from the load device.

10. The combination of a main drive electric motor, a machine, means providing mechanical driving connections between said motor and the machine to operate the latter at a predetermined speed, an auxiliary load device, means providing driving connections between the machine and said load device whereby the latter is driven at a predetermined speed in synchronism with the machine, said driving connections between the machine and auxiliary load device comprising a differential and an electro-magnetic clutch, an auxiliary electric motor energizable to an operating speed adapted to maintain said predetermined speed of the auxiliary load device, means by which the auxiliary motor is geared to the said mechanical driving connections at a point intermediate said clutch and the auxiliary load device, whereby the auxiliary motor is driven at its said operating speed by power transmitted from the main drive motor, and means for opening said clutch and concurrently energizing the auxiliary motor by connecting it to a source of current supply, whereby the said auxiliary load device is driven at said predetermined speed therefor by said auxiliary motor independently of the said machine and main drive motor upon opening said clutch.

11. The combination set forth in claim 10, including means for synchronizing the operation of the said load device relative to the operation of said machine, said synchronizing means comprising a reversible motor geared to said differential, and automatic motor control means including a selysn generator geared to said machine, a control selysn geared to said auxiliary load device, means connecting said selsyns electrically, and a positioning control unit operated by said control selsyn and controlling the operation of the said reversible motor, said positioning control unit being operable automatically to cause said reversible motor to drive the differential in a direction to bring said auxiliary load device into operating synchronism with the said machine.

12. The combination of a machine, a main drive electric motor operatively connected to the machine for driving the machine, an auxiliary load device adapted for operation in synchronism with the operation of said machine, means forming driving connections from the said machine to the auxiliary load device, said connections including a differential and electromagnetic clutch, an auxiliary motor having driving connections with the auxiliary load device, means for starting and stopping the main drive motor, means for automatically establishing a circuit for the auxiliary motor when the main drive motor is stopped and thereby causing the auxiliary motor to drive the auxiliary device without interruption when the main drive motor is stopped, means for automatically opening the clutch when the auxiliary motor is connected to drive said auxiliary load device, said auxiliary load device being operable in cycles, said machine having means operable in cycles, a selsyn generator, means providing a driving connection between the said machine and selsyn generator for driving the latter through one revolution for each cycle of the said machine, a control selsyn, means for providing driving connections between said auxiliary device and the control selsyn for operating the latter through one revolution for each cycle of the auxiliary device, means for electrically connecting said generator and control selsyns, a reversible electric motor, means providing driving connection between said reversible motor and said differential, a reversible starter for said reversible motor, an electrical positioning control unit electrically connected to said starter, and electrical connections from said control selsyn to said positioning control unit for operating the latter and thereby operating the starter for the reversible motor and thereby effecting operation of the reversible motor and differential and thereby bringing the load device into a phase relation to the main motor determined by the phase relation of the control selsyn to that of the selsyn generator.

13. In combination a machine, an auxiliary load device adapted for operation in synchronism with the operation of said machine at a predetermined speed, a main drive including an intermittently operable main motor, a main shaft connecting the main motor to drive the machine, a differential including input and output shafts, means providing a driving connection between the main motor and said input shaft, means providing a driving connection between said output shaft and the auxiliary load device and which includes a clutch operable so that the machine and auxiliary load device are operable either collectively or independently, an auxiliary motor, a driving connection for said auxiliary motor between said clutch and the auxiliary load device so that said auxiliary motor is driven under power of the main motor at an operating speed whenever the clutch is engaged, a source of current supply adaptable for energizing the auxiliary motor, switch means selectively operable for effecting alternatively either: (1) concurrently starting and operating the main motor, engaging the clutch, and de-energizing the auxiliary motor; (2) concurrently stopping the main motor, disengaging the clutch, and energizing the auxiliary motor; and (3) concurrently stopping the main motor and de-energizing the auxiliary motor, and control means for energizing the auxiliary motor to maintain its said operating speed in driving the auxiliary load device independently to correspond to the predetermined speed thereof provided by the main motor; the arrangement providing to operate the auxiliary load device at the same speed under said alternative (2) as its speed while operating under said alternative (1).

14. The combination of a machine, a main drive electric motor operatively connected to the machine for driving the latter at a predetermined operating speed, an auxiliary device adapted to be operated in synchronism with the operation of the machine, means providing driving connections extending between the machine and said auxiliary device for operating the latter at a predetermined synchronized speed with the former, the said driving connections including an electric transmitter motor driven by the main motor, an electromagnetic clutch, a receiver motor connected mechanically to the clutch and connected electrically with the transmitter motor, an auxiliary motor operatively connected to said auxiliary device independent of said clutch and operable to drive said device and maintain a speed of operation therefor corresponding with its synchronized operation while the said machine is at rest, means for starting and stopping the main drive motor thereby starting and stopping said machine, selective means for operating said clutch and thereby disconnecting the said driving connection between said receiver motor and the auxiliary device when the said machine is stopped, said selective means being operable to effect the operation of the auxiliary motor when the clutch is released and thereby maintaining the continuous operation of the auxiliary device upon operating the auxiliary motor and while the machine is at rest, and automatic means for synchronizing the operation of the said auxiliary device with that of the machine when the machine is started during the operation of said auxiliary device.

References Cited in the file of this patent

UNITED STATES PATENTS

| | | |
|---|---|---|
| 853,711 | Merrill | May 14, 1907 |
| 2,384,498 | Sloan | Sept. 11, 1945 |
| 2,607,166 | Youkers | Aug. 19, 1952 |
| 2,846,818 | Larison | Aug. 12, 1958 |
| 2,918,951 | Haumann | Dec. 29, 1959 |